(12) United States Patent
Hartmann et al.

(10) Patent No.: US 11,008,229 B1
(45) Date of Patent: May 18, 2021

(54) FILTER ELEMENT, METHOD OF PRODUCING A FILTER ELEMENT, FILTRATION DEVICE AND LIQUID TREATMENT SYSTEM

(71) Applicant: BRITA GMBH, Taunusstein (DE)

(72) Inventors: Tim Hartmann, Taunusstein (DE); Maria Fester, Wiesbaden (DE); Simon Floren, Waldbrunn (DE)

(73) Assignee: BRITA GMBH, Taunusstein (DE)

( * ) Notice: Subject to any disclaimer, the term of this patent is extended or adjusted under 35 U.S.C. 154(b) by 154 days.

(21) Appl. No.: 16/281,521

(22) Filed: Feb. 21, 2019

(51) Int. Cl.
| | | |
|---|---|---|
| *C02F 1/28* | (2006.01) | |
| *B01D 39/08* | (2006.01) | |
| *B01D 15/00* | (2006.01) | |
| *C02F 1/00* | (2006.01) | |
| *B01D 35/30* | (2006.01) | |
| *C02F 101/20* | (2006.01) | |
| *C02F 101/30* | (2006.01) | |

(52) U.S. Cl.
CPC ............ *C02F 1/288* (2013.01); *B01D 15/00* (2013.01); *B01D 35/30* (2013.01); *B01D 39/083* (2013.01); *C02F 1/003* (2013.01); *B01D 2239/0407* (2013.01); *B01D 2239/06* (2013.01); *B01D 2239/083* (2013.01); *B01D 2239/1216* (2013.01); *C02F 1/281* (2013.01); *C02F 1/283* (2013.01); *C02F 2101/20* (2013.01); *C02F 2101/30* (2013.01); *C02F 2307/02* (2013.01); *C02F 2307/04* (2013.01)

(58) Field of Classification Search
None
See application file for complete search history.

(56) References Cited

U.S. PATENT DOCUMENTS

| | | | | |
|---|---|---|---|---|
| 2004/0195180 | A1* | 10/2004 | Cumberland | B01D 39/2062 210/660 |
| 2006/0000763 | A1 | 1/2006 | Rinker et al. | |
| 2008/0023406 | A1* | 1/2008 | Rawson | C02F 1/003 210/688 |
| 2008/0110820 | A1* | 5/2008 | Knipmeyer | C02F 1/003 210/474 |
| 2014/0131923 | A1* | 5/2014 | Festner | B01D 39/1638 264/413 |

FOREIGN PATENT DOCUMENTS

| | | |
|---|---|---|
| WO | 2005108300 A1 | 11/2005 |
| WO | 2008036844 A2 | 3/2008 |
| WO | 2009140033 A2 | 11/2009 |
| WO | 2012175656 A1 | 12/2012 |
| WO | 2013139821 A1 | 9/2013 |
| WO | 2017097494 A1 | 6/2017 |

\* cited by examiner

*Primary Examiner* — Matthew O Savage
(74) *Attorney, Agent, or Firm* — Hudak, Shunk & Farine Co. LPA

(57) ABSTRACT

A filter element comprises a porous body. The porous body is made of bonded matter, including: at least one material for binding lead; and at least a binder having a Melt Flow Rate, MFR, of more than 1 g/10 min. The porous body has a Mean Flow Pore size, MFP, in a range of between 0.1 and 11 μm.

19 Claims, 4 Drawing Sheets

FILTER ELEMENT, METHOD OF PRODUCING A FILTER ELEMENT, FILTRATION DEVICE AND LIQUID TREATMENT SYSTEM

FIELD OF THE INVENTION

This disclosure relates generally to the production of filter elements comprising a porous body. Some embodiments may be useful in reducing the level of lead in drinking water.

BACKGROUND OF THE INVENTION

WO 2012/175656 A1 discloses a method and apparatus for use in manufacturing a filter element. The method includes forming a layered structure including forming a first layer comprising particulate matter comprising at least a binder and applying a second layer comprising at least a binder directly onto the first layer on a first side thereof. The layered structure is subjected to at least a heat treatment. The step of subjecting the layered structure to at least a heat treatment includes passing the layered structure through a double-belt press. Typically, the filter elements have a thickness larger than 1 mm, more particularly larger than 5 mm. In general, the thickness will be smaller than 20 mm, in particular smaller than 15 mm. Typically, the average pore size will be larger than 2 µm, in particular larger than 5 µm. The average pore size will be smaller than 50 µm. The particle size of the binder can be of the order of 10 to 1000 µm, for example. The binder is made of a meltable material, in particular a thermoplastic material. The melting point of the binder is at least 50° C., preferably higher than 100° C. The applicant currently markets a disc-shaped filter element manufactured in a similar way to that disclosed in WO 2012/175656 A1, but with a porous body comprising only a single layer. This filter element has a mean flow pore size of between 20 and 35 µm, and is used in filter bottles and jug-based, gravity-driven filtration systems.

WO 2009/140033 A2 discloses a filter medium comprising components:
  a) from 55 to 80 percent by weight of activated carbon particles having a particle size distribution with a $D_{50}$ in a range of from 70 to 130 µm and a $D_{10}$ in a range of from 25 to 50 µm;
  b) from 5 to 20 percent by weight of first catalytic activated carbon particles having a particle size distribution with a $D_{50}$ in a range of from 20 to 40 µm and a $D_{10}$ in a range of from 2 to 20 µm; and
  c) from 10 to 30 percent by weight of a thermoplastic binder, the thermoplastic binder binding at least the activated carbon particles and the catalytic activated carbon particles into a porous unitary body, wherein the percent by weight of components a)-c) is based upon a total weight of components a)-c). The filter medium is stated to have a relatively high capacity for removal of chloramine simultaneously with other water contaminants. An embodiment further comprises at least one lead removal medium in an amount of up to 20 percent by weight. Useful lead removal media are stated to include, for example, activated alumina (aluminium oxide) and cation exchange resins, as well as ATS (titanium silicate). The porous unitary body may be shaped as a hollow cylinder, thimble or disc. Materials used in the examples include high molecular weight polyethylene powder available as GUR 2126 UHMW PE and high molecular weight polyethylene powder available as GUR 4150-3 UHMW PE. Both have a Melt Flow rate (MFR) measured in accordance with ISO 1133 of less than 0.1 g/10 min, according to the manufacturer's data sheets.

WO 2005/108300 A1 discloses a filter block comprising filter particles having a median particle size of less than about 50 µm and having a particle span of about 1.4 or less. The filter block may comprise filter particles and a binder. At least about 50% by weight of the filter particles are activated carbon particles. An example filter block is made by a compression moulding process, in which about 42 g of carbon is mixed with about 13.2 g of Microthene low-density polyethylene FN 510-00 binder from Equistar Chemicals, Inc. and about 4.8 g of Alusil aluminosilicate powder from Selecto, Inc. A cylinder press is filled with the carbon mix and the cylinder wall is gently tapped to settle the mix. An upper piston is slowly lowered, completely engaged to 0.41 MPa pressure, and held for a few seconds. Then, the pressure is lowered to near zero and the upper piston is slowly retracted. Again, the cylinder is filled with more carbon mix, the cylinder wall is gently tapped and struck off to level the mix, the upper piston is slowly lowered to full engagement, and the pressure is raised to 0.41 MPa. This procedure is repeated one more time to fill the cylinder press completely with carbon mix. After the third fill, the 0.41 MPa pressure is maintained on the upper piston. Cylinder heat controllers are then turned on and the temperature is set to 204° C. A band heater is also turned on and a band heater controller Variac is set to approximately 288° C. The heating cycle lasts for 10 minutes. The filter block is stated to have a permeability of greater than about $3.0*10-9$ $cm^2$ and a Filter Viruses Log Removal (F-VLR) of greater than about 99%. According to the manufacturer's current data sheet, Microthene FN51000 has an MFR (in accordance with ASTM D1238) of 5.3 g/10 min. The relatively small particles and high pressure used to produce the filter block will result in very small pores and low porosity, and thus in a relatively high flow resistance. It would appear that the filter blocks are suitable for use only in filtration systems operating at least at mains water pressure.

NSF/ANSI standard 53 for the removal of lead from test water defines a test water composition (at pH 8.5) with the following properties: total lead content: 150 ppb±10% (135-165 ppb); at least 20-40% of the total lead content must be present in particulate form, with particle sizes above 0.1 µm; and at least 20% of the particulate lead must be in the size range of 0.1-1.2 µm.

The standard requires the filtrate to have a lead concentration below 10 ppb. This requirement is relatively hard to meet with a filter element suitable for a gravity-driven filtration system without decreasing the flow rate to impractical levels.

WO 2008/036844 A2 discloses a filter block made from about 40 wt.-% binder (GUR 2122), about 38 wt.-% powdered activated carbon and about 22 wt.-% lead removal (Alusil) media. Activated carbon size distribution such as the following was used: $D_{10}$ of about 10-30 µm; $D_{50}$ of about 70-100 µm; and $D_{90}$ of about 170-200 µm. It is stated that blocks made in the disclosed shape were found to perform effectively in water filtration, including obtaining lead removal results that meet the NSF standard 53 for lead in drinking water, while also achieving a flow rate of 1 litre per 4-7 minutes flow rate of water filtration. In order to form the media components into a solid profile, a mixture of the media components and a binder may be placed in a mould and may be compressed with a piston or weight on the mixture, for example, and heated to make the binder tacky enough to stick to the media particles, thus holding them together in a solid profile when cooled. It is stated that, typically, heating in a 204-260° C. oven for about 30 minutes will effectively heat the mixture to reach the desired amount of binder tackiness. Compression that reduces the volume of the mixture by about 10-20 percent is preferred, but this may vary and extend to a greater range (for example 10-40 percent) or lesser range of compression. According to the manufacturer's current data sheet, GUR 2122 has an MFR (in accordance with ISO 1133) of less than 0.1 g/10 min.

US 2006/0000763 A1 discloses a carbon block filter comprising approximately 20-90 wt.-% activated carbon particles, the activated carbon particles having a mean particle size between approximately 90 and 220 µm; and approximately 5-50 wt.-% polymeric material binder, the binder material interspersed with the activated carbon particles. A first exemplary carbon block filter comprises approximately 65 wt.-% of 80×325 mesh activated carbon, approximately 20 wt.-% ethylene vinyl acetate copolymer binder and approximately 15 wt.-% zeolite. The volume median pore diameter, determined by mercury porosimetry is reported as 12.04 µm. Another exemplary carbon block filter also comprises approximately 65 wt.-% of 80 χ 325 mesh activated carbon, approximately 20 wt.-% Very High Molecular Weight Polyethylene binder and approximately 15 wt.-% zeolite. The volume median pore diameter is reported as being 9.01 µm.

There is a need for a filter element, method of manufacturing it, filtration device and liquid treatment system that provide filter elements having good adsorption, requiring little binder and a low amount of energy to manufacture, and allowing for high flow rates at small pressure differentials.

SUMMARY OF THE INVENTION

Embodiments according to the invention are in particular disclosed in the attached claims directed to a filter element, a method of producing filter elements, a filtration device and a liquid treatment system, wherein any feature mentioned in one claim category, e.g. device, can be claimed in another claim category, e.g. method, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

According to a first aspect, a filter element comprises a porous body, wherein the porous body is made of bonded matter, including: at least one material for binding lead; and at least a binder having a Melt Flow Rate, MFR, of more than 1 g/10 min, wherein the porous body has a Mean Flow Pore size, MFP, in a range of between 0.1 and 11 µm.

The porous body is pervious to the liquid to be filtered, e.g. water, more particularly mains water. The porous body may have any shape, e.g. a disc shape or hollow cylindrical shape. The binder forms point bonds to hold the matter together and enable the porous body to retain its shape. The filter element may further include one or more pieces of liquid-pervious fabric applied to a surface of the porous body. The material for binding lead may be a material for the sorption, in particular adsorption, of dissolved lead. Common forms of dissolved lead are lead carbonate, lead hydroxide and lead hydroxycarbonate. The material for binding lead may be a material other than activated carbon, e.g. a ceramic sorbent. It has a high capacity for removing lead and other heavy metals. For example, activated carbon alone, when tested in accordance with the NSF 53 protocol at an influent lead level of 150 ppb will typically result in effluent lead levels of more than 70 ppb. The addition of even a small amount of material for binding lead as employed in the filter element of the present disclosure will lead to effluent lead levels of less than 2 ppb. Generally, the material, in unbound form, is effective to reduce the heavy metal concentration in water from above 50 ppb to below 5 ppb. The relatively high specific adsorption capacity is retained in the filter elements of the present disclosure. The material for binding lead specifically binds only charged contaminants, as opposed to, for example activated carbon, of which the particles are porous and which traps contaminants in its pores, but which, at least without surface treatment, is not very effective at binding heavy metal ions.

By forming the porous body, the material for binding lead is dispersed, so that it can have relatively small particle sizes without agglomerating. This makes efficient use of the material for binding lead, in that less of it is required to achieve a required treatment efficiency.

It is noted that the term melt flow rate, MFR, is synonymous with the term melt flow index. The binder has an MFR of more than 1 g/10 min as determined in accordance with international standard ISO 1133 or the technically equivalent standard ASTM D1238. This means that relatively little energy and a relatively low pressure are sufficient to achieve a filter element having a satisfactory stability. The low pressure in turn allows for good control of the porosity of the filter element. Furthermore, relatively little binder is required. As a result, the filter element is relatively cheap to manufacture. Moreover, the filter element will have good wettability, because binder reduces the wettability. This makes the filter element well-suited to use in filtration systems with a low-pressure differential, in particular, gravity-driven filtration systems or filter bottles.

The MFP in a range of between 0.1 and 11 µm, as determined e.g. in accordance with ASTM F316-03, ensures that the filter element is also effective in retaining particulate lead, even at concentrations above 60 ppb. The thickness required to achieve the necessary lead retention capacity does not at this pore size lead to a very high flow resistance. As a consequence, the filter element remains suitable for use in filtration systems imposing a low-pressure differential, in particular gravity-driven filtration systems. It is noted that the amount of lead present in particulate form increases strongly as the lead concentration rises above 150 ppb, the usual level employed for testing water filters. This makes the MFP more relevant, in particular because higher lead concentrations have been found in certain low-quality water supplies.

In an embodiment, the MFR of the at least one binder is at least 2 g/10 min. This further reduces the amount of binder required. Point bonds are formed relatively quickly without prolonged heating. There is thus relatively little compaction in the thermal bonding process, resulting in filter elements with low flow resistance.

In an embodiment, the MFP is smaller than 10 μm, e.g. smaller than 9 μm.

It has surprisingly been found that a markedly lower lead concentration in effluent is obtained, when the MFP is reduced below 10 μm. This is particularly the case when the influent has a lead concentration of about 150-200 μg/l.

In an embodiment, the bonded matter may be granular matter.

It may thus consist essentially of granular matter. The matter is present as grains, which are approximately spherical in shape. As a consequence, point bonds are formed between the binder particles and the other particles resulting in point bonds and relatively high porosity and specific surface area of the active material.

In an embodiment, the bonded matter includes a further material. This may be an inert material, e.g. quartz or other silicates. Less of the material for binding lead is required, but this material is still dispersed relatively well and the amount of binder can be kept low.

In an embodiment, the further material comprises particles having a mean particle size $D_{50}$ of at least 60 μm.

The particle size $D_{50}$ is the mass-mean diameter, and may be determined in accordance with at least one of the methods outlined in ASTM D 2862-97/04, laser scattering, X-ray diffraction or sieve analysis. The indicated particle size assures adequate porosity and adequately low flow resistance.

In an embodiment, the further material comprises particles having a mean particle size $D_{50}$ of below 250 μm.

This assures that particulate lead is filtered out effectively.

In an embodiment, the further material is present in the porous body in a proportion of at least 25% by weight of the total of the bonded matter.

Thus, the material for binding lead is dispersed relatively well without using a large amount of binder. The material for binding lead can be a commonly available material with relatively small particles.

In an embodiment, the further material is present in the porous body in a proportion of at most 94% by weight of the total of the bonded matter.

Thus, the filter element does not become too brittle and enough dissolved lead is removed.

In an embodiment, the further material comprises an adsorbent for adsorption of at least organic matter, e.g. activated carbon.

In an embodiment, the binder has a mean particle size $D_{50}$ of at least 20 μm, e.g. at least 50 μm, for example at least 100 μm. This results in adequate pore sizes and porosity and the formation of point bonds.

In an embodiment, the binder has a mean particle size $D_{50}$ of at most 200 μm, e.g. at most 150 μm, for example at most 120 μm.

The pore size of the filter element thus remains small enough to capture particulate lead. Moreover, the formation of point bonds that leave a relatively large amount of the surface of the active materials available for binding with contaminants is promoted.

In an embodiment, the binder is present in the porous body in a proportion of at most 50% by weight of the total bonded matter, e.g. less than 20% by weight of the total bonded matter.

This promotes wettability and effectivity in removing lead.

Moreover, the filter element is relatively inexpensive.

In an embodiment, the binder is present in the porous body in a proportion of at least 5% by weight of the total bonded matter.

This makes the filter element robust enough for use as a replaceable filter element in a filtration system. Abrasion is kept relatively low and relatively little fine matter is rinsed out of the filter element at first use.

In an embodiment, the binder comprises a thermoplastic polymer, e.g. polyethylene.

Polyethylene is readily available in forms certified for use in filters for liquids intended for human consumption, in particular drinking water. In an embodiment, the binder has an average molecular weight of at most $5*10^5$ g/mol.

In an embodiment, the binder has an average molecular weight of at least $2*10^5$ g/mol, e.g. at least $3*10^5$ g/mol.

In an embodiment, the binder has a Vicat softening point of at most 90° C.

This Vicat softening point, determined in accordance with ISO 306, allows for relatively low temperatures for the thermal bonding process.

In an embodiment, the material for binding lead comprises at least one of an ion exchange material, e.g. a zeolite, and a metal oxide.

One example is a ceramic cation exchanger. Alternatives include hematite ($\alpha$-$Fe_2O_3$), goetite ($\alpha$-FeOOH), magnetite ($Fe_3O_4$) and titanium oxide. The zeolite may be a natural or synthetic zeolite.

In an embodiment, the material for binding lead comprises a granular material having a mean particle size of at least 5 μm.

Smaller particles cannot readily be formed into a stable porous matrix by the binder. When the material has the indicated mean particle size, sufficiently many through-going pores are formed. Where the mean particle size has a larger value, e.g. at least 50 μm or at least 100 μm, a larger proportion of the bonded matter can comprise the material for binding lead without negatively affecting the pore size, porosity and number of trough-going pores.

In an embodiment, the material for binding lead comprises a granular material having a mean particle size of at most 200 μm, e.g. at most 50 μm.

Larger particles would result in large through-going pores and a relatively low tortuosity. Both lead to reduced rejection rates of small lead particles. Moreover, larger particle sizes would have lower catalytic activity and a lower adsorption capacity due to a relatively low effective surface area.

In an embodiment, the material for binding lead is present in the porous body in a proportion of at least 1% by weight of the total bonded matter.

An effect is to ensure that the recover rate of dissolved lead is sufficiently high.

In an embodiment, the material for binding lead is present in the porous body in a proportion of at most 25% by weight of the total bonded matter.

The material for binding lead may in that case comprise a granular material having a mean particle size of at most 50 μm, in order to achieve adequate pore sizes, porosity and number of through-going pores, and thus good permeability. Furthermore, relatively little binder would be needed to ensure that the particles are bound, thus ensuring that sufficient wettability is achieved.

In an embodiment, the porous body has a thickness of between 1 and 10 mm, e.g. between 5 and 10 mm.

In this context, the thickness determines the length of the path the liquid to be filtered has to travel through the filter element. It corresponds to the wall thickness (in radial direction) for a hollow cylindrical filter element or the shortest distance between the two major surfaces of a planar filter element. A filter element with the indicated dimension is effective to achieve the lead removal recovery requirements of NSF 53 standard, yet has a sufficiently low resistance to flow to allow it to be used in gravity-driven filtration systems or filter bottles.

In an embodiment, the porous body is a planar porous body.

This embodiment is relatively well-suited to use in a gravity-driven filtration system or a filter bottle. Compared with a hollow cylindrical filter element, there is a uniform pressure differential across the filter element. Thus, all of the liquid is treated to the same extent and the treatment capacity is uniformly exhausted. Furthermore, a planar porous body need not necessarily be formed in a mould, and it is easier to heat it relatively uniformly.

According to another aspect of the disclosure, the method of manufacturing a filter element includes:
providing loose matter comprising a mix of at least:
at least one material for binding lead; and
at least a binder having a Melt Flow Rate, MFR, of more than 1 g/10 min, and
forming the loose matter into a porous body having a Mean Flow Pore size, MFP, in a range of between 0.1 and 11 μm,
wherein forming the loose matter into a porous body includes thermally bonding the loose matter.

In an embodiment, the MFR of the at least one binder is at least 2 g/10 min.

In an embodiment, the loose matter is granular matter.

In an embodiment, the loose matter includes a further material.

In an embodiment, the further material has a mean particle size $D_{50}$ of at least 60 μm.

In an embodiment, the further material has a mean particle size $D_{50}$ of below 250 μm.

In an embodiment, the further material makes up at least 25% by weight of the loose matter.

In an embodiment, the further material makes up at most 94% by weight of the loose matter.

In an embodiment, the further material comprises an adsorbent for adsorption of at least organic matter, e.g. activated carbon.

In an embodiment, the binder has a mean particle size $D_{50}$ of at least 20 m, e.g. at least 50 μm, for example at least 100 μm.

In an embodiment, the binder has a mean particle size $D_{50}$ of at most 200 μm, e.g. at most 150 μm, for example at most 120 μm.

In an embodiment, the binder makes up at most 50% by weight of the loose matter, e.g. less than 20% by weight of the loose matter.

In an embodiment, the binder makes up at least 5% by weight of the loose matter.

In an embodiment, the binder comprises a thermoplastic polymer, e.g. polyethylene.

In an embodiment, the binder has an average molecular weight of at most $5*10^5$ g/mol.

In an embodiment, the binder has an average molecular weight of at least $2*10^5$ g/mol, e.g. at least $3*10^5$ g/mol.

In an embodiment, the binder has a Vicat softening point of at most 90° C.

In an embodiment, the material for binding lead comprises at least one of an ion exchange material, e.g. a zeolite, and a metal oxide.

In an embodiment, the material for binding lead comprises a granular material having a mean particle size of at least 5 μm.

In an embodiment, the material for binding lead comprises a granular material having a mean particle size of at most 200 μm, e.g. at most 50 μm.

In an embodiment, the material for binding lead makes up at least 1% by weight of the loose matter.

In an embodiment, the material for binding lead makes up at most 25% by weight of the loose matter.

In an embodiment, the porous body has a thickness of between 1 and 10 mm, e.g. between 5 and 10 mm.

In an embodiment, the porous body is a planar porous body.

In an embodiment of the method, forming the porous body comprises forming a sheet of thermally bonded matter and separating a portion of the sheet from a remainder of the sheet, wherein the porous body comprises the separated portion.

This is a relatively efficient method of manufacturing porous bodies or complete filter elements at a relatively high rate. They need not be individually moulded. The sheet can be heated in a heated calendar or similar apparatus, wherein the matter to be bonded passes through and emerges as thermally bonded. This apparatus can remain at the required process temperature, in contrast to a mould that needs to be heated and cooled in cycles. Thus, the production method can also be relatively energy-efficient.

In a particular version of this embodiment, forming the sheet of thermally bonded matter includes depositing the loose matter in a layer on a moving surface and heating the loose matter on the moving surface.

This version allows for continuous production of the sheet and porous bodies.

In an embodiment, heating the loose matter on the moving surface includes passing the layer through a double belt press.

This ensures adequately long contact times for heat transfer, so that a sufficient degree of bonding is achieved. Moreover, the layer is heated from both sides.

In an embodiment of the method, forming the porous body includes heating and compressing the loose matter.

The resulting porous bodies have good mechanical stability and the required heating time and temperature can be kept relatively low. In a version of this embodiment, compressing the loose matter includes reducing a collective dimension of the matter by between 5 and 60%.

Collective dimension refers to the dimension of the deposited loose matter as a collective, rather than the particle sizes. Thus, for loose matter deposited on a surface, it may correspond to the height of the layer of loose matter. The reduction is a linear reduction, e.g. of the height of a layer of deposited loose matter or of a quantity deposited in a mould. The percentage value is with reference to the initial value of the dimension before compression. The indicated range of values results in the required MFP values.

According to another aspect of the disclosure, a filtration device includes at least one filter element according to any one of the embodiments described above.

In an embodiment, the filtration device is a replaceable liquid treatment cartridge for a liquid treatment system, e.g. a gravity-driven liquid treatment system.

In a particular version of this embodiment, the filtration device further includes a cartridge housing made of liquid-impermeable material and having at least one inlet and at least one outlet, wherein a chamber is formed in the cartridge housing, wherein loose matter forming a liquid treatment medium is housed in the chamber, and wherein at least one of the at least one filter elements is comprised in one of a liquid inlet and a liquid outlet of the replaceable liquid treatment cartridge.

The loose matter forming a liquid treatment medium may include activated carbon, ion exchange resin or a mixture thereof. This embodiment can achieve a separation of functions, with the material in the chamber effective to remove different contaminants or the same contaminants to a different extent. It can also be used to provide a higher treatment capacity for particular additional contaminants than could feasibly be provided with just the filter element. In this way, the overall filtration device remains effective to remove lead and the other contaminant or other contaminants over a specified lifetime, the treatment capacity for each contaminant being exhausted approximately simultaneously. In a particular embodiment, the chamber houses at least a weakly acidic cation exchange resin. At least a portion, e.g. a majority, of the cation exchange resin may be in the hydrogen form. At least one filter element may be located downstream of the chamber, in particular if it includes a further material effective to filter out organic compounds from the liquid. Alternatively, or additionally, at least one filter element may be located upstream of the chamber, in use. This is useful in that the lead is removed before it can bind to the cation exchange resin in the chamber. This makes it easier to regenerate the cation exchange resin in the chamber at the end of the useful lifetime of the filtration device.

According to another aspect of the disclosure, a liquid treatment system includes a replaceable liquid treatment device comprising at least one filter element according to any one of embodiments described above.

The liquid treatment system may be a gravity-driven system or a filter bottle, for example, i.e. a liquid treatment system without a pump or at least without a pump having moving parts. The liquid treatment system may comprise a system for reducing pressure downstream of the filter element to draw the liquid to be treated through the filter element. The liquid treatment system may be comprised in a household appliance such as a kettle, a beverage-making appliance like a coffee percolator, or a refrigerator.

In an embodiment, the liquid treatment device is replaceable.

An embodiment of the liquid treatment system further comprises a container for holding liquid to be treated, wherein the liquid treatment device is held in a flow path from the container to an outlet for dispensing filtered liquid into a vessel.

The container may be a drinking bottle, for example.

In a version of the embodiment in which the liquid treatment system further comprises a container for holding liquid to be treated and the liquid treatment device is held in a flow path from the container to an outlet for dispensing filtered liquid into a vessel, the liquid treatment system is configured to position the container at a level higher than that of the outlet, in use.

The resulting liquid treatment system is thus basically a gravity-driven liquid treatment system. The container is commonly referred to as a hopper or funnel, provided with a seat for sealingly holding the liquid treatment device at an outlet thereof.

A version of this embodiment includes the vessel, wherein the container is mounted to the vessel and suspended above a bottom of the vessel.

The vessel may be provided with a pouring spout, where it is in the form of a jug, pitcher or carafe. The vessel may also be provided with a dispensing valve.

In another embodiment, the liquid treatment system comprises a drinking bottle having a mouthpiece, wherein the filter element is arranged between an interior of the drinking bottle and the mouthpiece. In use, the liquid, e.g. water, is filtered as it is sucked trough the filter element by the user of the bottle.

BRIEF DESCRIPTION OF THE DRAWINGS

Various details of the embodiments will become apparent from the accompanying drawings, in which.

DETAILED DESCRIPTION OF THE INVENTION

Figure 1:
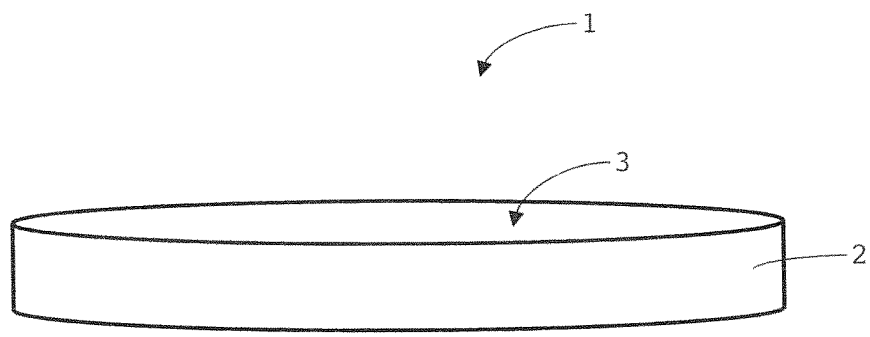
FIG. 1 is a schematic perspective view of a filter element.

A filter element 1 comprises a porous body 2 that is pervious to the liquid to be filtered, e.g. mains drinking water. The filter element 1 may include one or more sheets 3 of fabric, woven or non-woven, applied to a surface or surface section of the porous body 2. This fabric may be a mesh or fleece, for example non-woven fabric made of point-bonded polyester fibres. The porous body 2 is self-supporting.

The porous body 2 may be planar, having an essentially uniform thickness. In the illustrated embodiment, the porous body 2 is disc-shaped. In other embodiments, it may be square or rectangular. The thickness of the porous body 2 may be in the range of 1-10 mm, e.g. 5-10 mm. Its diameter may be at least twice, e.g. at least ten times its thickness. The opposing major surfaces may be essentially parallel. The fabric sheet 3 may be applied to one or both of the major surfaces only.

The porous body 2 is made of one or more layers of thermally bonded granular matter, which includes at least one material for binding lead present in ionic form in the liquid to be filtered. This material specifically sorbs lead and optionally other metal contaminants, as opposed to a specific sorbent such as activated carbon. The material for binding lead may comprise at least one of an ion exchange material, e.g. a zeolite, and a metal oxide. In one particular example, it is a granular ceramic ion exchange material having a mean particle size $D_{50}$ in the range of 5-200 μm, e.g. 5-50 μm. In particular, the nominal particle size $D_{50}$ may be within the range of 20-35 μm.

The thermally bonded matter further includes a binder having a melt flow rate (MFR) of more than 1 g/10 min, e.g. at least 2 g/10 min (measured in accordance with ISO 1183 using an MFR temperature of 190° C. and a load of 21.6 kg).

The binder may be a thermoplastic binder. In the particular example of the porous body 2 referred to above, it is polyethylene with a molecular weight in the range of $2*10^5$-$5*10^5$ g/mol, e.g. about $4*10^5$ g/mol, and an MFR of about 3.6 g/10 min. It has a Vicat softening temperature (in accordance with ISO 306) below 100° C., e.g. in the range of 50–100° C., for example in the range of 70–90° C. The mean particle size $D_{50}$ may be in the range of 20-200 μm, e.g. in the range of 100-120 μm.

The thermally bonded matter forming the porous body 2 further comprises activated carbon, e.g. granular activated carbon. The activated carbon may be coconut-based, for example. The activated carbon has a mean particle size $D_{50}$ in the range of 60-250 μm.

The activated carbon, binder and material for binding lead may together make up at least 99% by weight of the thermally bonded matter forming the porous body 2. In the example referred to above, the proportion of activated carbon lies in the range of 25-94%, the proportion of binder lies in the range of 5-50% and the proportion of the material for binding lead lies in the range of 1-80% by weight, e.g. 1-25% by weight. The porous body has a mean flow pore size MFP in a range of 0.1-11 μm.

As mentioned, the porous body 2 may be a layered structure, each layer being made of thermally bonded matter. One or more properties, e.g. porosity or mean flow pore size may vary between layers. In other embodiments, one or more parameters such as porosity or mean flow pore size may exhibit a gradient in the direction of flow.

Figure 2:
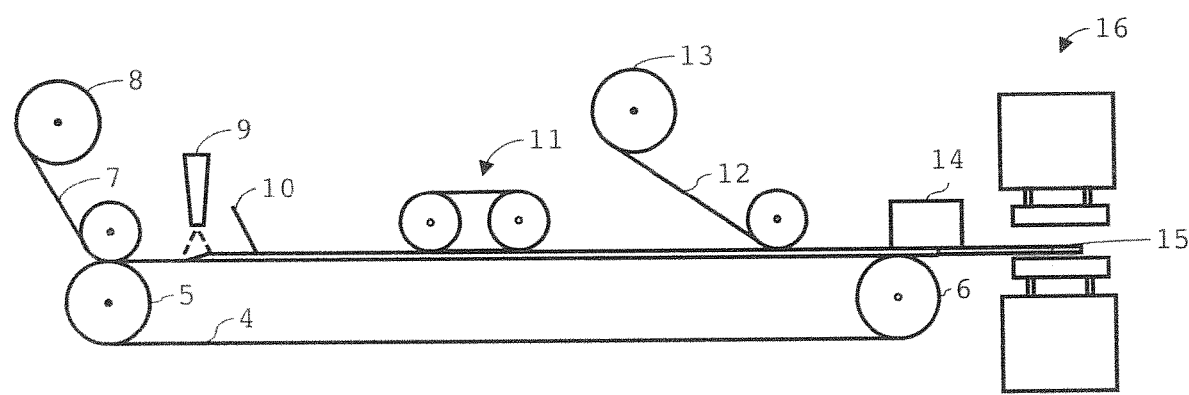
FIG. 2 is a diagram of an apparatus for manufacturing filter elements.
Figure 3:
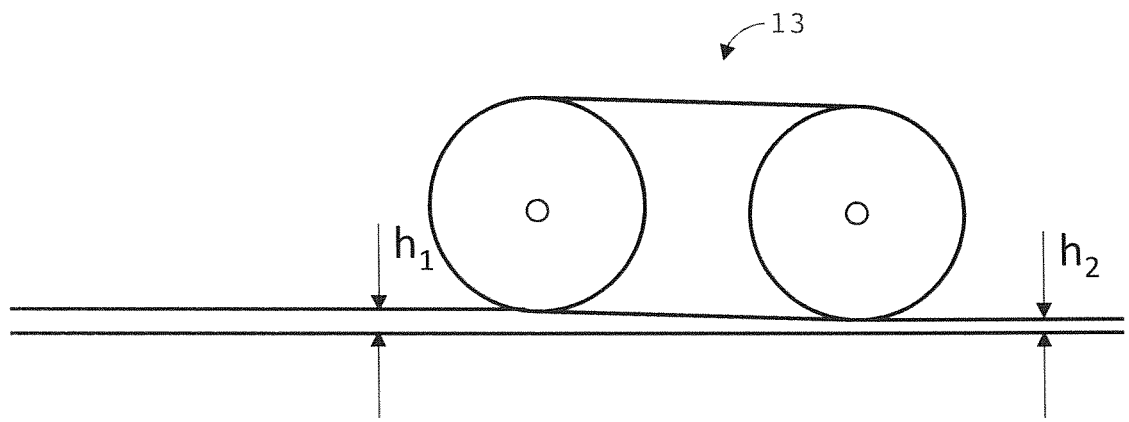
FIG. 3 is a detailed view of a section of the apparatus of FIG. 2.

An apparatus (FIGS. 2 and 3) for manufacturing a filter element 1 provided with a covering fabric sheet 3 on both major surfaces includes a main endless belt 4 on support drums 5,6, of which at least one is driven by a motor (not shown). A lower web 7 of fabric is unwound from a first reel 8 onto the main belt 4.

A device 9 for depositing a layer of loose matter to be thermally bonded onto the moving lower web 7 may comprise a hopper, for example. A doctor blade 10 is provided to set an initial height of the layer. Thereafter, the layer and the lower web 7 pass through a double-belt press 11, where heat is applied and the height of the layer is reduced from an initial value $h_1$ to a final value $h_2$ corresponding to the thickness of the filter element 1. The degree of compression, $h_1/-h_2/h_1$, has a value in the range of 5-60%, specifically in the range of 30-50%.

The temperature at the point of contact between the double-belt press 11 and the layered structure is between 130 and 230° C., that is to say between 50 and 150° C. above the Vicat softening temperature of the binder, but the contact time is relatively short, e.g. in the range of 5-20 min. The pressure applied is relatively low, e.g. below 5000 Pa. An upper web 12 of fabric is unwound from a second reel 13 and applied to the layer.

A first cutting device 14 cuts plates 15 from the layered structure. Each plate 15 is then transferred to a second cutting device 16, where the individual filter elements 1 are cut from the plate. The remainder can be shredded and recycled, e.g. processed into activated carbon or milled and admixed to the loose matter deposited by the depositing device 9. The first cutting device 14 and the step of cutting plates 15 may be dispensed with in an alternative embodiment. In that alternative case, the filter elements 1 would be cut from the layered structure directly in a continuous process. The second cutting device 16 may be a laser cutting device or a water jet cutting device, for example.

The filter element 1 forms or is comprised in a replaceable component of a liquid treatment system.

Figure 4:
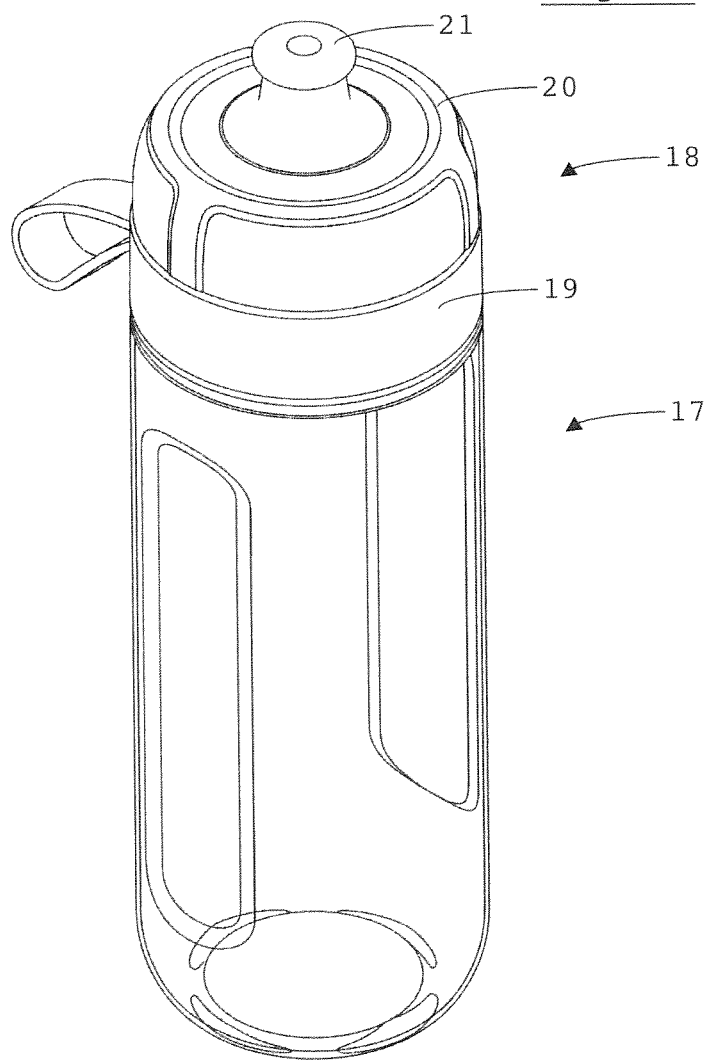
FIG. 4 is a perspective view of a liquid treatment system in the shape of a drinking bottle.
Figure 5:
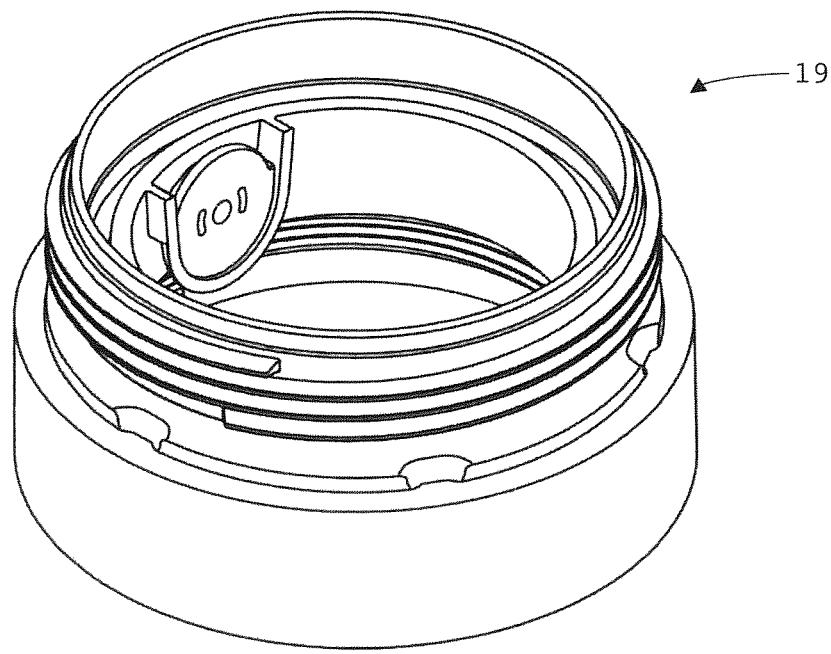
FIG. 5 is a perspective view of a first part of a top of the drinking bottle, including a seat for receiving the filter element.
Figure 6:
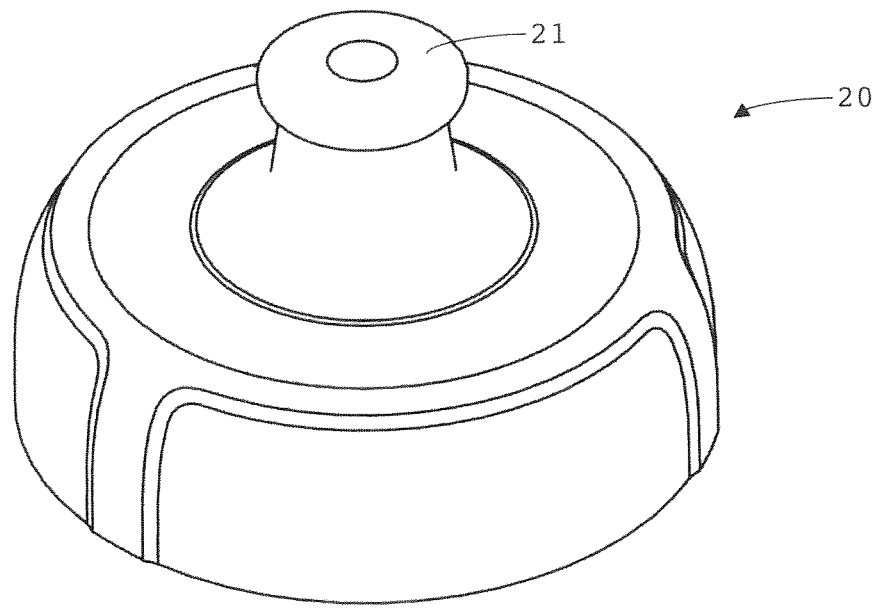
FIG. 6 is a perspective view of a second part of the top of the drinking bottle, configured to co-operate with the first part to engage the filter element in a sealed manner.

A first example of a liquid treatment system (FIGS. 4-6) comprises a drinking bottle 17 with a top 18 comprising a first part 19 and a second part 20 that co-operate to hold the filter element 1 in a sealed relationship to the bottle top 18 between the interior of the bottle and a mouthpiece 21. The first part 19 is releasably connected to the drinking bottle 17 at a mouth of the latter. The second part 20 is releasably attached to the first part 19, in this case by means of a threaded connection, after the filter element 1 has been placed in a recess formed in the first part 19. In use, water is sucked through the filter element 1. To re-fill the drinking bottle 17, the entire top 18, with the filter element 1 held in it, is removed.

Figure 7:
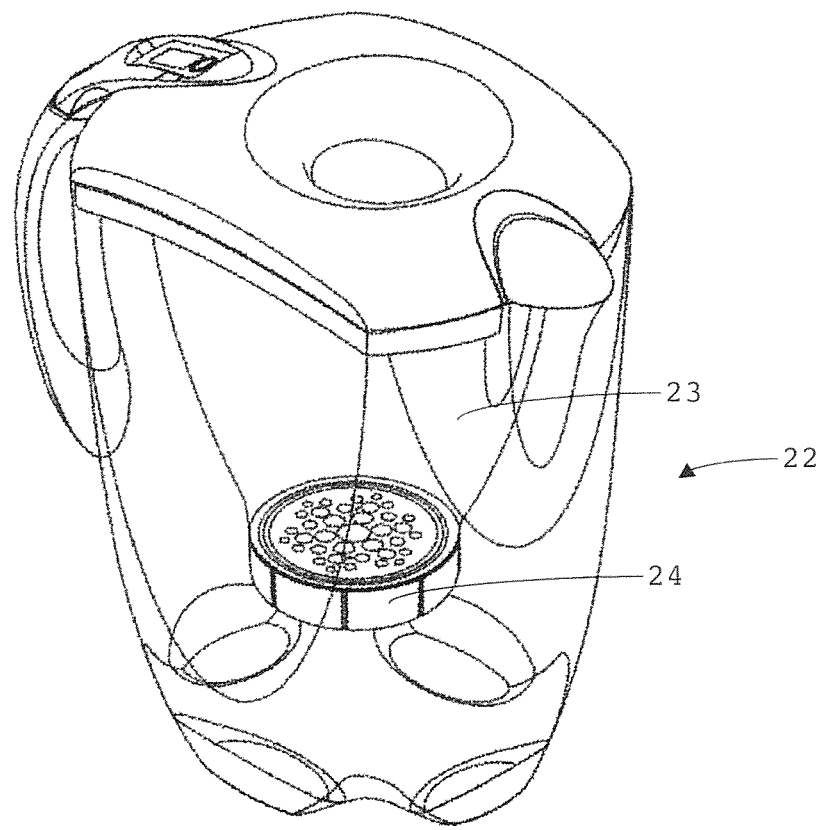
FIG. 7 is a perspective view of a gravity-driven liquid treatment system comprising a jug and a funnel.

A second example of a liquid treatment system (FIG. 7) is a gravity-driven liquid treatment system comprising a jug 22 in which a funnel 23 is suspended above a bottom of an interior of the jug 22. An arrangement for holding the filter element 1 in a sealed relation to the funnel 23 at an outlet thereof comprises a removable mounting ring 24 allowing for replacement of the filter element 1. Such an arrangement is described in more detail in WO 2017/097494 A1, the contents of which are incorporated by reference.

Figure 8:
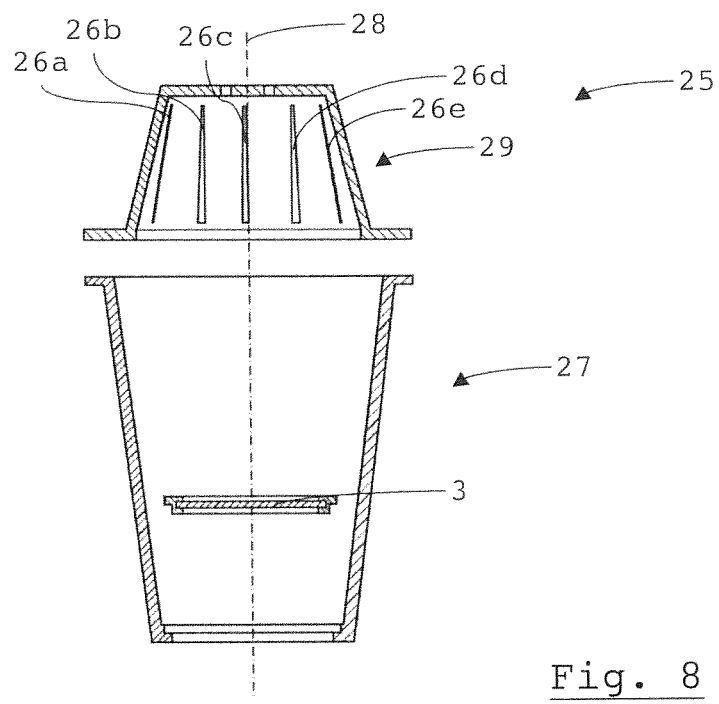
FIG. 8 is a schematic exploded cross-sectional view of a filtration device in the form of a replaceable cartridge including both a chamber for housing a liquid treatment medium and a filter element as shown in FIG. 1.

Alternatively, the funnel 23 can be provided with a seat for sealingly engaging a liquid treatment cartridge 25 (FIG. 8) of the type disclosed in more detail in WO 2013/139821 A1, the contents of which are incorporated by reference. This cartridge 25 includes a cartridge housing made of liquid-impermeable material and having at least one inlet 26a-e and at least one outlet. In this example, the cartridge housing includes a first, beaker-shaped, housing component 27 having a side wall for forming a boundary of a chamber in radial direction with respect to a main axis 28. The first housing component 27 is closed at an axial end forming an axial end of the cartridge 25 by a filter element 1 framed by a rim of liquid-impermeable material bonded to the first housing component 27, so that the filter element 1 forms an outlet of the cartridge 25 and a bottom wall of the chamber formed therein. The first housing component 27 is closed at an opposite axial end by a second, cap-shaped, housing component 29, in which openings forming the inlets 26a-e are formed. The chamber formed in the liquid treatment cartridge 25 may house at least one of ion exchange resin and loose activated carbon. Thus, the liquid treatment system in which the liquid treatment cartridge 25 is deployed can remove other substances, e.g. those contributing to carbonate hardness, in addition to meeting standards for lead removal such as NSF 53.

Filter elements for a liquid treatment system according to the second example (FIG. 7) have been produced and tested. The filter elements were manufactured without the fabric sheets 3. Each had a thickness of about 6.3 mm and a diameter of about 90 mm. Three specifications A-C were used and two filter elements of each specification were tested. All were manufactured on an apparatus of the type described above.

The specifications were as shown in Table 1.

TABLE 1

| | Activated carbon | Components | Compression [%] | MFP [μm] |
|---|---|---|---|---|
| A | $D_{50,3}$ = 78 μm. | 65 wt.-% activated carbon; 25 wt.-% binder; 10 wt.-% lead adsorbent | 33 | 10 |

TABLE 1-continued

| | Activated carbon | Components | Compression [%] | MFP [μm] |
|---|---|---|---|---|
| B | $D_{50,3}$ = 78 μm. | 65 wt.-% activated carbon; 25 wt.-% binder; 10 wt.-% lead adsorbent | 45 | 7 |
| C | $D_{50,3}$ = 60 μm. | 65 wt.-% activated carbon; 25 wt.-% binder; 10 wt.-% lead adsorbent | 33 | 7 |

The binder was High-Molecular Weight Polyethylene (HMW-PE) having an MFR (in accordance with ISO 1183) of 3.6 g/10 min. (MFR temperature: 190° C.; MFR load 21.6 kg) and an average particle size $D_{50}$ of 110 μm. The lead adsorbent was a ceramic ion exchange material having nominal particle sizes between 20 and 35 μm, marketed as ATS by BASF Corp.

In the test, filter elements in accordance with specifications A-C were compared with a filter element according to a further specification D. A sample with specification D had an MFP of 11.4 μm and activated carbon with a mean particle size $D_{50,3}$ of 110 μm. The proportions by weight of the activated carbon, binder and lead adsorbent were the same as for specifications A-C and the binder and lead adsorbent used were also the same Challenge water in accordance with NSF 53/ANSI Standard 53, 7.4.3.5.2.3 was prepared and the influent and effluent lead concentrations were measured. The detection limit was 5 ppb.

The results for specification A were as set out in Table 2.

TABLE 2

| | Influent | | | | | Effluent lead concentration | |
|---|---|---|---|---|---|---|---|
| | Total | Particulate total | | Particulate <1.2 μm | | Sample 1 | Sample 2 |
| Liter | [ppb] | [ppb] | [%] | [ppb] | [%] | [ppb] | [ppb] |
| 1 | 133 | 92 | 69 | 62 | 67 | 7 | 6 |
| 4 | 133 | 92 | 69 | 62 | 67 | <5 | 7 |
| 5 | 145 | 74 | 51 | 37 | 50 | <5 | <5 |
| 8 | 145 | 74 | 51 | 37 | 50 | <5 | <5 |

The results for specification B were as set out in Table 3.

TABLE 3

| | Influent | | | | | Effluent lead concentration | |
|---|---|---|---|---|---|---|---|
| | Total | Particulate total | | Particulate <1.2 μm | | Sample 1 | Sample 2 |
| Liter | [ppb] | [ppb] | [%] | [ppb] | [%] | [ppb] | [ppb] |
| 1 | 164 | 95 | 58 | 44 | 46 | <5 | 6 |
| 3 | 164 | 95 | 58 | 44 | 46 | <5 | 6 |
| 5 | 164 | 95 | 58 | 44 | 46 | <5 | <5 |
| 10 | 153 | 88 | 58 | 31 | 35 | <5 | <5 |

The results for specification C were as set out in Table 4

| | Influent | | | | | Effluent lead concentration | |
|---|---|---|---|---|---|---|---|
| | Total | Particulate total | | Particulate <1.2 μm | | Sample 1 | Sample 2 |
| Liter | [ppb] | [ppb] | [%] | [ppb] | [%] | [ppb] | [ppb] |
| 1 | 157 | 106 | 68 | 63 | 59 | <5 | 6 |
| 3 | 157 | 106 | 68 | 63 | 59 | <5 | 6 |
| 5 | 159 | 126 | 79 | 85 | 67 | <5 | <5 |
| 10 | 159 | 103 | 65 | 55 | 53 | <5 | <5 |
| 12 | 159 | 103 | 65 | 55 | 53 | <5 | <5 |

The results for specification D were as set out in Table 5

TABLE 5

| | Influent | | | | | Effluent lead concentration | |
|---|---|---|---|---|---|---|---|
| | Total | Particulate total | | Particulate <1.2 μm | | Sample 1 | Sample 2 |
| Liter | [ppb] | [ppb] | [%] | [ppb] | [%] | [ppb] | [ppb] |
| 1, 5 | 147 | 115 | 78 | 26 | 23 | 17 | 16 |
| 3 | 147 | 115 | 78 | 26 | 23 | 12 | 16 |
| 6 | 147 | 115 | 78 | 26 | 23 | 11 | 11 |
| 7, 5 | 154 | 130 | 84 | 67 | 52 | 15 | 14 |
| 9 | 154 | 130 | 84 | 67 | 52 | 11 | 13 |
| 12 | 154 | 130 | 84 | 67 | 52 | 9 | 10 |

It will be apparent that the sample filter elements in accordance with specifications A-C were easily able to meet current requirements for lead reduction. Moreover, the filtration rate was determined to be below 10 min./l for the gravity-driven system used for testing.

The invention is not limited to the embodiments described above, which may be varied without departing from the scope of the accompanying claims. For example, different materials for binding lead may be incorporated into the porous body 2 and together have the properties (particle size, proportion of thermally bonded matter) of the material for binding lead disclosed above. The same is true for the binder.

In cases in which the mean particle size of the material for binding lead is relatively high, more of that material may be present. Indeed, activated carbon may be omitted in such embodiments.

LIST OF REFERENCE NUMERALS 1 filter element
2 porous body
3 sheet
4 main belt
5 first support drum
6 second support drum
7 lower web
8 first reel
9 depositing device
10 doctor blade
11 double-belt press
12 upper web
13 second reel
14 first cutting device
15 plate 16 second cutting device
17 drinking bottle
18 bottle top
19 first bottle top part
20 second bottle top part
21 mouthpiece
22 jug
23 funnel
24 mounting ring
25 cartridge
26a-e inlets
27 first housing component
28 main axis
29 second housing component

What is claimed is:

1. A filter element, comprising:
a porous body,
wherein the porous body is made of bonded matter, including:
at least one material for binding lead; and
at least one binder having a Melt Flow Rate, MFR, of at least 2 g/10 min,
wherein the porous body has a Mean Flow Pore size, MFP, in a range between 0.1 and 11 μm.

2. The filter element according to claim 1, wherein the MFP is between 0.1 and 11 μm.

3. The filter element according to claim 1, wherein the bonded matter includes a further material, wherein the further material comprises particles having a mean particle size $D_{50}$ of between 60 μm and 250 μm.

4. The filter element according to claim 3, wherein the further material is present in the porous body in a proportion of between 25% and 94% by weight of the total of the bonded matter.

5. The filter element according to claim 3, wherein the further material comprises activated carbon.

6. The filter element according to claim 1, wherein the binder has a mean particle size $D_{50}$ between 50 μm and 120 μm.

7. The filter element according to claim 1, wherein the binder is present in the porous body in a proportion of less than 20% by weight of the total bonded matter.

8. The filter element according to claim 1, wherein the binder has an average molecular weight of between $2*10^5$ g/mol and $5*10^5$ g/mol.

9. The filter element according to claim 1, wherein the binder has a Vicat softening point of at most 90° C.

10. The filter element according to claim 1, wherein the material for binding lead comprises at least one of an ion exchange material in the form of a zeolite and a metal oxide.

11. The filter element according to claim 1, wherein the material for binding lead comprises a granular material having a mean particle size of between 5 μm and 50 μm.

12. The filter element according to claim 1, wherein the material for binding lead is present in the porous body in a proportion of between 1% and 25% by weight of the total bonded matter.

13. A filtration device, including at least one filter element according to claim 1.

14. The filtration device according to claim 12, wherein the filtration device is a replaceable liquid treatment cartridge for a gravity-driven liquid treatment system.

15. The filtration device according to claim 12, wherein the filtration device further includes a cartridge housing made of liquid-impermeable material and having at least one inlet and at least one outlet,
wherein a chamber is formed in the cartridge housing,
wherein loose matter forming a liquid treatment medium is housed in the chamber, and
wherein at least one of the at least one filter elements is comprised in one of a liquid inlet and a liquid outlet of the replaceable liquid treatment cartridge.

16. A liquid treatment system including a replaceable liquid treatment device comprising at least one filter element according to claim 1.

17. The liquid treatment system according to claim 16, wherein the liquid treatment device is replaceable.

18. The liquid treatment system according to claim 16, further comprising a container for holding liquid to be treated, wherein the liquid treatment device is held in a flow path from the container to an outlet for dispensing filtered liquid into a vessel.

19. The liquid treatment system according to claim 16, wherein the liquid treatment system comprises a drinking bottle having a mouthpiece, and wherein the filter element is arranged between an interior of the drinking bottle and the mouthpiece.

* * * * *

UNITED STATES PATENT AND TRADEMARK OFFICE
CERTIFICATE OF CORRECTION

| | |
|---|---|
| PATENT NO. | : 11,008,229 B1 |
| APPLICATION NO. | : 16/281521 |
| DATED | : May 18, 2021 |
| INVENTOR(S) | : Tim Hartmann et al. |

It is certified that error appears in the above-identified patent and that said Letters Patent is hereby corrected as shown below:

On the Title Page

Item (72), replace "Maria Fester" with -- Maria Festner --.

Signed and Sealed this
Fourteenth Day of June, 2022

*Katherine Kelly Vidal*

Katherine Kelly Vidal
*Director of the United States Patent and Trademark Office*